(12) United States Patent
Dahar

(10) Patent No.: US 7,556,793 B2
(45) Date of Patent: Jul. 7, 2009

(54) RUTILE TITANIA CATALYST CARRIER

(75) Inventor: Stephen L. Dahar, Solon, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 621 days.

(21) Appl. No.: 11/145,724

(22) Filed: Jun. 6, 2005

(65) Prior Publication Data

US 2006/0286026 A1   Dec. 21, 2006

(51) Int. Cl.
*B01J 21/06* (2006.01)
*B01J 32/00* (2006.01)
*B01J 35/10* (2006.01)
*C01G 23/04* (2006.01)
*C01G 23/047* (2006.01)
*C01G 23/08* (2006.01)

(52) U.S. Cl. .................... 423/610; 423/69; 423/266; 423/274; 423/608; 502/349; 502/350; 502/439

(58) Field of Classification Search .................. 423/69, 423/81, 266, 267, 274, 608, 610; 502/439, 502/349, 350

See application file for complete search history.

(56) References Cited

U.S. PATENT DOCUMENTS

| | | | |
|---|---|---|---|
| 4,061,596 A | 12/1977 | Matsushita et al. | |
| 4,214,913 A | 7/1980 | Glaeser | |
| 4,388,288 A | 6/1983 | Dupin et al. | |
| 4,482,643 A | 11/1984 | Harju et al. | |
| 4,547,598 A | 10/1985 | Sanderson et al. | |
| 4,705,770 A | 11/1987 | Cullo | |
| 5,002,917 A | 3/1991 | Deller | |
| 5,120,701 A | 6/1992 | Brand | |
| 5,169,821 A | 12/1992 | Soled et al. | |
| 5,185,480 A | 2/1993 | Sanderson et al. | |
| 5,204,300 A * | 4/1993 | Kumagai et al. | 501/127 |
| 5,208,203 A | 5/1993 | Horiuchi et al. | |
| 5,225,600 A | 7/1993 | King et al. | |
| 5,231,067 A | 7/1993 | Deller | |
| 5,366,938 A | 11/1994 | Deller | |
| 5,484,757 A | 1/1996 | Szymanski | |
| 5,536,487 A | 7/1996 | Hartmann | |
| 5,962,367 A | 10/1999 | Shen et al. | |
| 6,548,039 B1 | 4/2003 | Duyvesteyn et al. | |
| 6,699,446 B2 | 3/2004 | Lakshmanan et al. | |
| 6,740,620 B2 | 5/2004 | Bogan, Jr. et al. | |
| 6,841,699 B2 | 1/2005 | Bogan, Jr. et al. | |

FOREIGN PATENT DOCUMENTS

WO    WO 95/33559    12/1995

OTHER PUBLICATIONS

Millennium Chemicals, "Titanium Dioxide Manufacturing Processes", http://www.millenniumchem.com.
Kirk-Othmer *Encyclopedia of Chemical Technology*, "Titanium Compounds (Inorganic)", vol. 24, pp. 244-245, Copyright 2005 by John Wiley & Sons, Inc.

* cited by examiner

*Primary Examiner*—Timothy C Vanoy
*Assistant Examiner*—Serena L Hanor
(74) *Attorney, Agent, or Firm*—Fay Sharpe LLP; Ann M. Skerry; Stewart A. Fraser

(57) ABSTRACT

A method of forming a shaped article includes forming a mixture which includes a titania hydrate pulp having a loss on ignition of from about 10 to 45 wt. %, a seed material comprising a titanium oxide, at least a portion of the titanium oxide being in a rutile form, and optionally a dispersion aid. The method includes forming the mixture into a shaped article and firing the shaped article. A shaped article suitable for use as a catalyst carrier is at least 90% titanium oxide, greater than 80% of the titanium oxide being in the rutile phase. The article has a surface area of at least 2.5 m²/g and a mercury pore volume of greater than 0.15 cc/g.

27 Claims, No Drawings

RUTILE TITANIA CATALYST CARRIER

BACKGROUND

The present application relates to a shaped article which includes titanium dioxide in a rutile form and which is suited to use as a catalyst carrier and to a method for forming the shaped article. It finds particular application in connection with a catalyst carrier in which at least about 80% of the titanium dioxide is in the rutile form that is particularly useful in hydrocarbon conversion processes.

Titanium dioxide (titania) based carriers are widely used to support catalyst compositions that are to be exposed to elevated temperatures in use. Carrier materials are commonly produced by mixing a titania powder with a temporary binder formulation until an extrudable paste is formed, then forming the paste into the desired shape, drying the shape, and firing to burn out the temporary binder and to convert the titania to a solid stable material. The titania carrier can be obtained in the shape of pellets or individual relatively small, ring-based shaped structures, such as "wagon wheels" or any other extruded shapes with constant cross-sections (as a result of extruding a continuous rod and then cutting the rod into pellets of the desired size) or large honeycomb monoliths. During firing, the titania changes phase from the amorphous phase to the anatase form (octahedral). Then, above about 800° C., it begins to transform to the rutile form.

While high firing temperatures can yield materials with good attrition resistance and corrosion resistance, the high firing temperatures are also associated with low surface areas making the materials less suited for catalyst supports.

BRIEF DESCRIPTION

In accordance with one aspect of the present exemplary embodiment, a method of forming a shaped article is provided. The method includes forming a mixture which includes a titania hydrate pulp having a loss on ignition of from about 10 to 45 wt. %, a seed material comprising a titanium oxide, at least a portion of the titanium oxide being in a rutile form, and optionally a dispersion aid, forming the mixture into a shaped article and firing the shaped article.

In accordance with another aspect of the present exemplary embodiment, a method of forming a shaped article is provided. The method includes forming a mixture including a titania hydrate pulp comprising oxidized titanium, at least 20% of the oxidized titanium being in an amorphous form, a seed material comprising titanium oxide, at least a portion of the titanium oxide being in a rutile form, less than 5% of the titanium oxide being in an amorphous form, and a dispersion aid. The method further includes forming the mixture into a shaped article and firing the shaped article.

In accordance with another aspect of the present exemplary embodiment, a shaped article comprising titania is provided. The article has having the following characteristics: at least 90% of the article being titanium oxide, greater than 80% of the titanium oxide being in the rutile phase, a surface area of at least 2.5 $m^2/g$, and a mercury pore volume of greater than 0.15 cc/g.

An advantage of at least one aspect of the present embodiment is the provision of a catalyst carrier with significantly improved surface area and pore volume.

Another advantage of at least one aspect of the present embodiment is the provision of a catalyst carrier with higher attrition resistance, strength and corrosion resistance than conventional carriers of comparable surface area and pore volume.

Another advantage of at least one aspect of the present embodiment is the provision of a process which enables extruded or pressed parts to be made economically from a titania hydrate pulp which retain the high purity of the starting materials and are largely rutile but yet have a surface area and pore volume significantly higher than has previously been possible.

DETAILED DESCRIPTION

Aspects of the present embodiment are directed to a process for forming a shaped article containing titania and to a titania-containing shaped article. The shaped article may be used as a catalyst carrier (a support for a catalyst) or as a catalyst itself, and is suited for use in applications where chemical corrosion resistance and attrition resistance are desirable. Titania and titanium dioxide are used interchangeably herein to refer to a titanium oxide which may be stoichiometric ($TiO_2$) or non-stoichiometric, unless otherwise noted. For such applications, the titania may be in the form of pressed pellets or extruded shaped particles which may have a large geometrical surface area.

Many catalytic applications for the exemplary carrier favor the use of high surface area catalyst supports. While conventional methods can achieve this by firing to moderately high temperatures to convert the titania to its anatase form, it has been found that such carriers tend to have little mechanical strength or attrition resistance and in some cases, little corrosion resistance. Conventionally, higher temperatures, which favor formation of rutile, have yielded higher attrition resistance and corrosion resistance at the expense of decreases in surface area, In one embodiment, the present method enables moderately high firing temperatures to be used for generating carriers with comparable surface areas to those conventionally produced at similar firing temperatures, while providing higher mechanical strength, corrosion resistance, and attrition resistance, which are normally associated with much higher firing temperatures. In another embodiment, the process allows extruded or pressed parts to be made economically from a titania hydrate pulp which retain the high purity of the starting materials and are largely rutile but yet have a surface area and pore volume significantly higher than has previously been possible.

The present process thus yields a carrier that can have properties that are not expected from a titania carrier which may be up to about 100% pure titania, of which greater that about 90% may be in the rutile form.

The rutile and anatase contents of the carrier can be measured by X-ray diffraction, for example, as determined by Philips Highscore software's semi quantitative analysis. Specifically, the RIR method of semi-quantitative analysis is used with phase identified using ICCD card numbers 21-1276 for rutile and 71-1166 for anatase. Another suitable X-ray diffraction method for phase determination is Rietveld refinement.

The carrier may be substantially titania, e.g., greater than 95 weight % titania, in one embodiment, greater than 98 wt. % titania and in one specific embodiment 99-100 wt. % titania, and in practice, generally up to about 99.5% titania. The titania may be greater than 80% in the rutile form, in one embodiment, at least about 90% in the rutile form, and in one specific embodiment, greater than 95% in the rutile form. The carrier can have a high attrition resistance, e.g., less than 1% for 1.6 mm pellets as measured by ASTM 4058-92, and in one embodiment, less than about 0.4%, and a high crush strength, e.g., greater than 2.0 kg/mm and generally greater than 3.0 kg/mm for 1.6 mm pellets as measured by ASTM D4179-01. This results in a catalyst which retains its integrity in situations where abrasive contact with adjacent particles occurs and which withstands substantial compressive forces.

A method for forming the shaped article includes combining a titanium-containing starting material with a titania-containing seed material in a liquid medium and mixing to provide a substantially homogeneous mixture. A dispersion aid, such as an acid or base, may be incorporated into the mixture to aid dispersion. The shaped articles are formed by extrusion or pressing and removal of the liquid media, e.g., through drying, and firing. The firing is carried out at a suitable temperature and for a suitable time for achieving a desired rutile titania content and/or desired properties, such as surface area.

In one embodiment, the method includes combining a titanium starting material, such as a titania hydrate pulp, with water, optionally a dispersion aid, such as an acid or base, and a seed material, generally in the form of a comminuted titania, which is at least partially in the rutile form. The seed material may be in any suitable form, such as in the form of a powder or a slurry. The water, acid, rutile seed slurry, and hydrated pulp can be added to a mixing device and mixed to achieve a satisfactory homogenization. The resulting paste can be extruded or dried first, for example, at a temperature of about 80°-120° C. The extruded paste can be dried and fired, as descried above. In another embodiment, the dry paste can be ground to a flowable powder and pressed to form tablets. The formed parts obtained are calcined, for example, at a temperature of between about 700° C. and about 1000° C. for a period of from about 0.5 to 6 hours. The temperature and time may be varied to achieve a desired rutile percentage while retaining a desirable surface area and pore volume for a given application.

In accordance with specific embodiments, the mixture can have the following composition before forming: a titania hydrate pulp; between about 0.1 and 20 wt % seed material, based on the LOI adjusted weight of $TiO_2$ in the titania hydrate pulp, and an acid or base in a sufficient amount to achieve dispersion of the starting materials. In one specific embodiment, the mixture is 1.0-10.0 wt % seed material, based on the LOI adjusted weight of $TiO_2$ in the titania hydrate pulp. For example, an acid used as a dispersion aid may be present at about 0.1-8 wt % acid based the LOI adjusted weight of $TiO_2$ in the titania hydrate pulp, and in one specific embodiment, 1.0-5.0 wt. % acid. The acid weight % values are based on formic acid (molecular weight 46, for a 90 wt. % solution of the acid, with 10 wt. % water). Other acids may be used in similar weight amounts or at comparable acidity.

LOI adjusted weight is the weight adjusted for Loss On Ignition. Generally, a material is heated to at least 1000° C. for 1 hr to drive off all the physical and chemically bonded water, carbonates, nitrates, chlorides, and the like, leaving only the oxide form of the material which does not lose any more weight.

The mixture may also include burnout materials. These materials are substantially burned out during firing. For example, the mixture optionally includes about 0.1 to 5 wt % of a binder and/or surface stabilizer, such as a cellulose-based polymer, based on the LOI adjusted weight of $TiO_2$ in the titania hydrate pulp, in one embodiment, 1.0-5.0 wt % binder/surface stabilizer. Examples include methyl cellulose, hydroxypropyl cellulose, hydroxypropyl methyl cellulose and starch. The mixture optionally includes synthetic burnout materials, such as polyethylene waxes, polypropylene waxes, and co-polymers thereof. Such burnout materials can act as pore formers and may be present at from about 0.01 to about 30 wt %, based on the LOI adjusted weight of $TiO_2$ in the titania hydrate pulp. The pore former may have an average particle size of from about 1 to 1000 μm, e.g., between 10 and 300 μm.

Seed Material

The seed material may be a fine particulate material which is readily dispersed with a uniform dispersion. The seed material may have an average particle size of less than about 5 microns, in one embodiment, less than about 1.0 microns. The seed material may have a D(90) of less than 10 microns, in one embodiment, a D(90) of less than about 5 microns. In one embodiment, the seed material has an average particle size of <0.5 microns with a D(90) of <2 microns. The seeds may have a particle size as low as practically feasible, e.g., a D(90) as low as about 10 nanometers. In one embodiment, the seed material has an average particle size of at least about 20 nanometers.

D values are a common way of reporting particle size. D(90) means that 90% of the particles are finer than the value reported for D(90). D(50) is the median particle size.

Excluding any water present, the particulate seed material is predominantly titania. In one embodiment, the seed material has a wt. % titania of at least 90%, in one embodiment, 99-100 wt % titania. The LOI adjusted weight may be at least 95% titania, e.g., 99-100 wt % titania. The titania in the seed material can be greater than 10% in the rutile form, e.g., about 20% rutile titania, or greater, as measured by x-ray diffraction and can be up to 95% rutile, or greater. In one exemplary embodiment, the seed material is less than 40% rutile. In another exemplary embodiment, the seed material is at least 70% rutile, e.g., at least about 80% in the rutile form, or at least about 95% in the rutile form. The rutile content of the titania in the seed material can be substantially lower than the rutile content of the titania in the finished shaped articles and yet enable desired properties, in terms of surface area etc. to be achieved at lower firing temperatures than in the absence of the seed material. In one embodiment, the seed material has substantially no amorphous forms of titania present. For example, the seed material is less than 5% amorphous, e.g., less than about 1% amorphous.

The seed material may be formed by any suitable process for forming crystalline titania, for example, using the sulfate or chloride process or a pyrogenic method. In the sulfate process, digestion of a titania-containing raw material, such as ilmenite ore or "titanium slag" (residue after extraction of titanium) is carried out in sulfuric acid. This results in the conversion of titanium oxide and other metal oxides present in the raw material, to their sulfates. A mixture of metal sulfates is separated in cake form. The cake is dissolved in water or weak acid and titanium sulfate separated from other metal sulfates present. The titanium sulfate is then hydrolyzed by boiling a solution of the sulfate, which results in precipitation of a finely divided titanium dioxide pulp. The size of the particles may be controlled by seeding of the sulfate solution. The pulp is filtered, and washed. The resulting product is then calcined and milled, if desired.

In the chloride process, a natural or synthetic rutile is reacted with chlorine to yield titanium tetrachloride. A titanium hydrolysate is formed by acid hydrolysis of the titanium tetrachloride to give titanic acid with associated residual acid. The product is hydrolyzed, filtered, dried, and calcined.

One suitable seed material is Tiona™ RL-11A™, which may be obtained from Millennium Chemical, Baltimore, Md., which has a rutile content of about 98%.

Another suitable seed material is pyrogenically produced titanium dioxide. This is produced by means of high-temperature hydrolysis of a volatile titanium compound, usually titanium tetrachloride, in an oxyhydrogen flame, as disclosed, for example, in U.S. Pat. Nos. 5,231,067 and 5,366,938 and German Patent DE-PS 870,242 (1953). The resulting products primarily exhibit an anatase structure. They are hydrophilic, very pure and extremely fine. The primary particles (DIN 53 206) exhibit a spherical form and diameters of 10-100 nm, e.g., an average primary particle size of 30 nm. The specific surface area according to the BET method can be between 20 and 100 $m^2/g$, depending on production conditions, e.g., about 50±5 $m^2/g$. An exemplary pyrogenic titania is available as P-25™, from Degussa, Germany, which is about 20% rutile.

The Titanium-Containing Starting Material

The titanium-containing starting material may be one which is converted to titanium dioxide upon firing. It can be a titania hydrate pulp or other form of titania which has a rutile titania content which is lower than that of the formed shaped articles. Exemplary titanium-containing starting materials are those which are substantially amorphous, i.e., which have not been fired at a temperature or under conditions which lead to formation of rutile forms of titanium dioxide. While the method is described in terms of a titania hydrate pulp, it will be appreciated that other forms of titania may be employed.

Titania hydrate pulps (also referred to as titanium hydrolysate) are generally highly amorphous forms of titanium oxide/hydroxide which can be in the form of a solid, paste, or suspension. The titanium hydroxide content can be greater than 10% by wt., e.g., about 40 wt. %, or greater. In one embodiment, the titanium in the hydrate pulp is less than about 10% in the form of rutile titania. In one embodiment, the titania in the hydrated pulp is less than about 1% rutile and can be as low as 0% rutile. The balance of the titanium can be in the form of non-rutile forms of titania or titanium hydroxide. In one embodiment, greater than about 40 wt. % of the titania present is in the form of anatase, e.g., about 50%, or more, with the balance being amorphous forms of titania, as measured by X-ray diffraction. The titania in the hydrated pulp can be as high as 100% anatase. Depending on the method of formation, the titania hydrate pulp can contain small amounts of impurities, such as sulfur, e.g., in the form of titanium sulfates. In one embodiment at least about 20% of the titania hydrate pulp is in an amorphous form and in one specific embodiment, about 30% of the titania hydrate pulp is in an amorphous form.

A solid titania hydrate pulp may have a surface area of from about 100 to about 450 $m^2/g$. In one embodiment, the surface area is at least about 150 $m^2/g$, and in another embodiment, at least about 200 $m^2/g$ and in one specific embodiment, about 350+/−100 $m^2/g$. The solid titania hydrate pulp may have a loss-on-ignition (LOI) of less than about 45 wt. %, in one embodiment, at least 10 wt. %, e.g., from about 15-40 wt %, and in one embodiment, from about 15-20 wt. %.

The titania hydrate pulp, prior to dispersion, may have a particle size of from about 1 to about 15 microns, e.g., about 7.5 microns.

In one process, the titania hydrate pulp is formed by digestion of a titania-containing raw material, such as ilmenite ore or "titanium slag" (residue after extraction of titanium), in sulfuric acid and separating from the mixture a solution of a titanium sulfate which is then hydrolyzed to give titanic acid with some associated sulfuric acid. The acid is at least partially neutralized to form a colloidal suspension comprising hydrated titanium hydroxide. This material can be dewatered, for example by drying, to reduce the free water to less than about 10%, e.g., about 1% or less. This process is similar to the sulfate process, but without the final calcination step.

Another process for forming the hydrate pulp involves the acid hydrolysis of titanium tetrachloride to give titanic acid with associated residual acid. Partial neutralization and dewatering may proceed as for the sulfuric acid process.

The Dispersion Aid

The dispersion aid assists in dispersing the particulate components. In particular, the titania hydrate pulp may be in the form of clusters of particles of about 1-10 μm in diameter which are dispersed by the dispersing agent as finer particles. The appropriate amount of dispersing agent can be determined by studying the viscosity of the mixture or by evaluation of the product and determining an appropriate amount of dispersion aid to achieve desired properties. During mixing, the viscosity of the slurry drops. In some cases, an insufficient amount of dispersion aid can result in the mixing process being unduly long or in the resulting viscosity being too high for ease of processing by the selected subsequent processing methods.

The dispersion aid may be organic or inorganic acid. Examples of suitable organic acids include, but are not limited to formic, acetic, hydroxyacetic, citric, lactic, and oxalic acids. Suitable inorganic acids include nitric acid. The acid may lower the pH of the slurry to about 5.0 or below, e.g., about pH 4.5, or below. Suitable bases include alkali metal hydroxides and ammonium hydroxide.

For some catalytic processes impurities in the carrier resulting from the dispersion aid can poison the catalyst. For such applications, dispersion aids which result in those impurities are avoided. For example, Cl and S are catalytic poisons in some applications. Thus, for such applications, HCl and $H_2SO_4$ can be avoided as dispersion aids.

The seed material can be dispersed and/or milled in water before combining with other ingredients. In principle, any liquid mixer or mill which achieves satisfactory homogenization is suitable for carrying out this step. Suitable mills include ball mills and other high energy mills, such as a Union Process Attritor. The seed slurry can alternatively be dispersed using an air or electric mixer fitted with a high shear blade, such as a Cowles blade. The water, acid, rutile seed slurry and hydrated pulp can be added to a mixing device and mixed to achieve satisfactory homogenization. In principle, any liquid mixer which achieves satisfactory homogenization or mixing is suitable for carrying out the mixing step. Suitable mixers include those manufactured by Eirich, Lancaster, and Littleford. The result is a paste which can be directly extruded or it can be dried first, e.g., at a temperature of about 80-120° C. The extruded paste can be dried and fired, as described above. In another embodiment, the dry paste can be ground to a flowable powder which can then be pressed to form tablets.

The formed parts can be produced in a variety of shapes such as cylindrical, spherical, annular or trilobe. For example, shaped pellets may be formed by extruding a continuous rod of the paste and then cutting the rod into pellets of the desired size. Ring-based shaped structures of any desired configuration such as "wagon wheels" or any other extruded shapes with constant cross-sections such as for example multi-lobed structures and small honeycombs may be formed by extruding the paste through a suitably shaped die and then cutting to the rod into pellets of a constant cross section. The shaped articles may also be in the form of large honeycomb monoliths. However the extrusion/pressing process is not limited to these shapes. The parts may have an outer diameter (or average width, when non-circular) of from about 0.8 to 25 mm, although other sizes may be formed.

The formed parts can either be used directly as catalysts or as catalytic carriers after the shaped bodies have been impregnated, during or after their formation, with a solution of a catalytically active substance and optionally activated by means of suitable post-treatment. Suitable catalytically active substances include transition metal elements, such as those from groups VB, VIIIB and IB of the periodic table of elements, e.g., vanadium, gold, platinum group metals, and others. Exemplary applications in which the carrier may be employed include the catalytic formation of amines as described, for example, in U.S. Pat. No. 5,225,600; diesel engine exhaust gas purification, as disclosed, for example, in U.S. Pat. No. 5,208,203; decomposition of organic peroxides to form alcohols, for example, using the process of U.S. Pat. No. 4,547,598; removal of peroxide contaminants from alcohol product streams, for example, according to the process of U.S. Pat. No. 5,185,480; and in the Fischer-Tropsch process, for example, as disclosed in U.S. Pat. No. 5,169,821.

The formed parts may be advantageously formed to be at least about 99% $TiO_2$ which may be greater than 95% in the rutile form. The parts may have a surface area, as measured by nitrogen absorption, of greater than about 2.5 $m^2/g$. The surface area is typically between about 3 and 15 $m^2/g$. In one embodiment, the surface area is greater than about 4.5 $m^2/g$, and in one specific embodiment, greater than about 5 $m^2/g$. In one embodiment, the surface area is up to about 7 $m^2/g$.

The parts may have a mercury pore volume of greater than about 0.15 cc/g, in one embodiment, greater than about 0.2 cc/g. In one embodiment, between 20 and 90% of the pores have a diameter between about 100 and 200 nm, and in one aspect, between 100 and 120 nm. The pore structure can be monomodal, bimodal or trimodal or multimodal. Determination of total pore volume and median pore diameter can be performed by mercury intrusion, e.g., using a Micrometrics 9500 Poresizer.

While not being bound by any particular theory, it is understood that the highly dispersed seeds initiate heterogeneous nucleation of the rutile phase at a temperature that is below what could be achieved where nucleation occurs by homogeneous nucleation. Discussion of heterogeneous and homogeneous nucleation can be found in Phase Transformations in Metals and Alloys, 2nd Edition by D. A. Porter and K. E. Easterling (Chapman & Hall, New York, 1992).

Without intending to limit the scope of the invention, the following examples demonstrate the process of forming a catalyst carrier and properties of the products obtained.

EXAMPLES

Table 1 lists properties of the raw materials used in the following Examples.

TABLE 1

Raw Material Properties

|  | Titania Hydrate Pulp | Seed Material | |
|---|---|---|---|
| Trade Name | G-5 | RL-11A | P-25 |
| Particle Size Distribution (microns) | | | |
| D (10%) | 0.9 | 0.3 | 0.6 |
| D (50%) | 1.4 | 0.5 | 1.3 |
| D (90%) | 2.4 | 1.2 | 2.8 |
| X-Ray Diffraction Pattern | | | |
| % Anatase | 69.5 | 2 | 85 |
| % Rutile | 0.5 | 98 | 15 |
| Average Amorphous phase wt % | 30 | 0 | 0 |
| Crystallite Size, in Angstroms | 75 | | >300 |
| Surface Area, $m^2/g$ | 350 +/− 100 | | 50 +/− 15 |
| LOI. % | 15-20 | | <1.5 |
| Nitrogen Pore Volume in cc/g | 0.3-0.4 | | 0.1-0.15 |
| Chemical Analysis | | | |
| % S | 0.2-0.3 | | ND |
| % $SiO_2$ | 0.01 | | 0.04 |
| % $Al_2O_3$ | <0.01 | | <0.01 |
| % $Na_2O$ | 0.03 | | 0.03 |
| % CaO | 0.03 | | 0.03 |
| % MgO | <0.01 | | <0.01 |
| % $ZrO_2$ | 1.0 | | 0.6 |

X-ray diffraction properties (% anatase, % rutile, and % amorphous phase) were determined using Rietveld Analysis of X-ray diffraction patterns using an alpha alumina standard. Mercury pore volumes were measured in the following examples with a Micrometrics 9500 Poresizer. Surface areas were measured with a Micrometrics Tri-Star 3000 gas absorption analyzer using nitrogen gas, with all samples being first degassed at 250° C. for 2 hours.

The Rietveld analysis uses the algorithm: X'PERT PLUS Rietveld, which is based on the source codes of the program LHPM1 (Apr. 11, 1988) of R. J. Hill and C. J. Howard, which in turn is a successor of the program DBW3.2 from D. B. Wiles and R. A. Young. In principle the Rietveld method is based on the equation:

$$Y_{ic} = Y_{ib} + \sum_{p} \sum_{k=k_1^p}^{k_2^p} G_{ik}^p I_k$$

where $Y_{ic}$ is the net intensity calculated at point i in the pattern, $Y_{ib}$ is the background intensity, $G_{ik}$ is a normalized peak profile function, $I_k$ is the intensity of the kth Bragg reflection, $k_1 \ldots k_2$ are the reflections contributing intensity to point i, and the superscript p corresponds to the possible phases present in the sample. The intensity $I_k$ is given by the expression:

$$I_k = SM_k L_k |F_k|^2 P_k$$

where S is the scale factor, $M_k$ is the multiplicity, $L_k$ is the Lorentz polarization factor, and $F_k$ is the structure factor, $$F_k = \sum_{j=1}^{n} f_j \exp[2\pi i(h_r^t r_j - h_k^t B_j h_k)]$$

where $f_j$ is the scattering factor or scattering length of atom j, and $h_k$, $r_j$ and $B_j$ are matrices representing the Miller indices, atomic co-ordinates and anisotropic thermal vibration parameters, respectively, and the superscript t indicates matrix transposition.

The factor $F_k$ is used to describe the effects of preferred orientation: no preferred orientation is indicated with $F_k=1$. The positions of the Bragg peaks from each phase are determined by their respective set of cell dimensions, in conjunction with a zero parameter and the wavelength provided. All of these parameters except the wavelength, may be refined simultaneously with the profile (see below) and crystal structure parameters. The ratio of the intensities for two possible wavelengths is included in the calculation of $|F_k|^2$, so that only a single scale factor for each phase is required. This ratio cannot be refined.

Crystallite Size is determined from x-ray line broadening, as follows:

$$D = \frac{K\lambda}{\beta \cos\theta}$$

(the Scherrer formula) where D is the average crystallite size (in Angstroms), $\lambda$ is the wavelength in Angstroms (1.54 Å for Cu), and $\beta$ is the pure diffraction broadening (in radians) and $\theta$ is the Bragg angle. The Bragg angle $\theta$ is the angle of the incidence of the x-ray beam with respect to the sample surface at the reflection maximum. K is a constant and for the purpose of these calculations was set equal to 0.9.

In X'pert Highscore, the Scherrer calculator determines the crystallite size by comparing the profile width of a standard profile with a sample profile according to the Scherrer formula above. The anatase peak at 25.3° was used to determine crystallite size. X-Ray diffractometer conditions for the Panalytical Xccelerator XRD unit were:

X-ray tube voltage: 45 KV
X-ray tube current: 40 mA
Scan step: 0.0167°
Scan speed: 0.101281°/sec Chemical analysis of the P25 and G-5 materials was performed by inductively coupled plasma. Surface area was determined via the BET method with nitrogen. LOI was determined after heating at 1000° C. for 1 hour.

Examination of crystallites by electron microscopy showed P-25 as having a regular block structure and G-5 as having a random structure of connected irregular particles.

Example 1

Comparative Example 8.2 g of formic acid (90% acid by weight) was premixed with 95 g of deionized (DI) water. 250 g of 18% LOI titania hydrate pulp (G-5™ from Millenium Chemical) was dry mixed with 4.1 g of a methyl cellulose (Methocel K4M™, obtained from Dow Chemical Company). The water/acid mixture was added to the dry mixture and mixed until a homogeneous paste was formed (within about 120 minutes). The paste was then extruded through a ⅛ inch (0.32 cm) die. The extrudates were dried at 100° C. and fired at a number of times and temperatures as shown in Table 2. 0.0% of the titania in the formed parts was derived from rutile seed.

Example 2

8.2 g of formic acid was premixed with 95 g of DI water and 0.20 g of rutile (RL-11A™, Millennium Chemical, Baltimore, Md.) titania for 30 minutes. The mixer used was a standard electric motor fitted with a Cowles blade. 250 g of 18% LOI titania hydrate pulp (G-5) was dry mixed with 4.1 g of Methocel K4M. The water acid mixture was added and mixed until a homogeneous paste was formed. The paste was then extruded through a ⅛ inch die. The extrudates were dried at 100° C. and fired at a number of times and temperatures as shown in Table 2. 0.10% of the titania in the formed parts was derived from rutile seed.

Example 3

8.2 g of formic acid was premixed with 95 g of DI water and 2.05 g of rutile titania (RL-11A). The mixer used was a standard electric motor with a Cowles blade. 250 g of 18% LOI titania hydrate pulp was dry mixed with 4.1 g of Methocel K4M. The water acid mixture was added and mixed until a homogeneous paste was formed. The paste was then extruded through a ⅛ inch die. The extrudates were dried at 100° C. and fired at a number of times and temperatures as shown in Table 2. These parts contained 1.0% titania derived from rutile seed.

Example 4

8.2 g of formic acid was premixed with 95 g of DI water and 20.5 g of rutile titania (RL-11A™). The mixer used was a standard electric motor with a Cowles blade. 250 g of 18% LOI titania hydrate pulp was dry mixed with 4.1 g of Methocel K4M. The water acid mixture was added and mixed until a homogeneous paste was formed. The paste was then extruded through a ⅛ inch die. The extrudates were dried at 100° C. and fired at a number of times and temperatures as shown in Table 2. 10.0% of the titania in the formed parts was derived from rutile seed.

TABLE 2

Properties of Parts Formed Using RL-11A Seeding in an Acidic Dispersed System

|  | Example 1 | Example 2 | Example 3 | Example 4 |
|---|---|---|---|---|
| Wt % seed | 0 | 0.1 | 1.0 | 10 |
| 800° C., 1 hour |  |  |  |  |
| % Rutile | 0 | NA | NA | 27 |
| Surface Area, m²/g | 14 | NA | NA | 13.3 |
| 850° C., 1 hour |  |  |  |  |
| % Rutile | 2 | 4 | 20 | 61 |
| Surface Area, m²/g | 8 | 8.4 | 8.4 | 8 |
| HgPV, cc/g | NA | 0.26 | 0.29 | NA |
| 900° C., 1 hour |  |  |  |  |
| % Rutile | 22 | 34 | 75 | 96 |
| Surface Area, m²/g | 5.3 | 6.0 | 5.3 | 5.5 |
| 925° C., 1 hour |  |  |  |  |
| % Rutile | NA | 77 | 95 | NA |
| Surface Area, m²/g | NA | 4.88 | 4.60 | NA |
| 800° C., 3 hours |  |  |  |  |
| % Rutile | 1 | NA | NA | 38 |
| Surface Area, m²/g | 11 | NA | NA | 10.6 |
| 850° C., 3 hours |  |  |  |  |
| % Rutile | 5 | 15 | 42 | 82 |
| Surface Area, m²/g | 4.8 | 6.6 | 6.4 | 6.6 |

NA indicates not available
HgPV- mercury pore volume

Example 5

8.2 g of formic acid was premixed with 95 g of DI water and 20.5 g of pyrogenic titania (P-25™, Degussa, Germany). The mixer used was a standard electric motor with a Cowles blade. 250 g of 18% LOI titania hydrate pulp was dry mixed with 4.1 g of Methocel K4M. The water acid mixture was added and mixed until a homogeneous paste was formed. The paste was then extruded through a ⅛ inch die. The extrudates were dried at 100° C. and fired at a number of times and temperatures as shown in Table 3. 1.0% of the titania in the formed parts was derived from titania seed.

Example 6

8.2 g of formic acid was premixed with 95 g of DI water and 20.5 g of pyrogenic titania (P-25). The mixer used was a standard electric motor with a Cowles blade. 250 g of 18% LOI titania hydrate pulp was dry mixed with 4.1 g of Methocel K4M. The water acid mixture was added and mixed until a homogeneous paste was formed. The paste was then extruded through a ⅛ inch die. The extrudates were dried at 100° C. and fired at a number of times and temperatures as shown in Table 3. 10.0% of the titania in the formed parts was derived from titania seed.

TABLE 3

Properties of Parts Formed Using P-25 Seeding in an Acidic Dispersed System

|  | Example 5 | Example 6 |
|---|---|---|
| Wt % seed | 1.0 | 10 |
| 700° C., 1 hour |  |  |
| % Rutile | 2 | 7 |
| Surface Area, m²/g | NA | NA |
| 800° C., 1 hour |  |  |
| % Rutile | 11 | 49 |
| Surface Area, m²/g | NA | NA |
| 850° C., 1 hour |  |  |
| % Rutile | 65 | 95 |
| Surface Area, m²/g | 7.6 | 7.3 |
| HgPV, cc/g | NA | 0.23 |
| 875° C., 1 hour |  |  |
| % Rutile | 90 | 98 |
| Surface Area, m²/g | 6.3 | 6.2 |
| HgPV, cc/g | 0.25 | 0.25 |
| 850° C., 3 hours |  |  |
| % Rutile | 87 | 98 |
| Surface Area, m²/g | 6.0 | 6.0 |
| HgPV, cc/g | 0.26 | 0.23 |

Example 7

Formation of a basic seed slurry: 66.6 g of RL-11A (98% rutile) was combined with 200 g of DI water and 1.4 g of 30 wt % NH$_4$OH in a 1 liter ball mill containing 6 mm zirconia grinding media. The slurry was milled for 1 hour and, was 25 wt % solids.

Example 8

0.82 g of the milled basic slurry from Example 7 were mixed with 140 g of DI water and 5 g of 30wt % NH$_4$OH. 250 g of 18% LOI titania hydrate pulp was dry mixed with 4.1 g of Methocel K4M. The slurry was added to the mixture and mixed until a homogeneous paste was formed. The paste was then extruded through a ⅛ inch die. The extrudates were dried at 100° C. and fired at a number of times and temperatures as shown in Table 4. 0.1% of the titania in the formed parts was derived from rutile seed.

Example 9

8.2 g of the milled slurry from Example 7 were mixed with 140 g of DI water and 5 g of 30 wt % NH$_4$OH. 250 g of 18% LOI titania hydrate pulp was dry mixed with 4.1 g of Methocel K4M, the slurry was added to the mixture and mixed until a homogeneous paste was formed. The paste was then extruded through a ⅛ inch die. The extrudates were dried at 100° C. and fired at a number of times and temperatures as shown in Table 4. 1.0% of the titania in the formed parts was derived from rutile seed.

TABLE 4

Properties of Parts Formed Using RL-11A Seeding in a Basic Dispersed System

|  | Example 8 | Example 9 |
|---|---|---|
| Wt % seed | 0.1 | 1.0 |
| 850° C., 1 hour |  |  |
| % Rutile | 7 | 31 |
| 875° C., 1 hour |  |  |
| % Rutile | 18 | 61 |
| 900° C., 1 hour |  |  |
| % Rutile | 50 | 90 |
| 875° C., 3 hours |  |  |
| % Rutile | 45 | 88 |

Example 10

Comparative Example 1362 g of 18% LOI titania hydrate pulp was dry mixed with 11 g of Methocel K4M and 340.5 g of polypropylene wax powder (Propyltex 200s™, MicroPowders Inc, Tarrytown, N.Y.). Then 681 g of DI water and 45 g of formic acid were combined and added to the powder and mixed until a homogeneous paste was formed. The paste was then extruded through a 1/16 inch die. The extrudates were dried at 100° C. and fired at a number of times and temperatures as shown in Table 5. None of the titania in the formed parts was derived from titania seed.

Example 11

150 g of formic acid was premixed with 3.9 kg of DI water and 227 g of P-25 titania. The mixer used was a standard electric motor with a Cowles blade. 5.5 kg of 18% LOI titania hydrate pulp was dry mixed with 91 g of Methocel K4M and 1362 g of Propyltex 200s™. The water acid mixture was added and mixed until a homogeneous paste was formed. The paste was then extruded through a ⅛ inch die with a 1/16" pin. The extruded rings were dried at 100° C. and fired at a number of times and temperatures as shown in Table 5. 5.0% of the titania in the formed parts was derived from titania seed.

TABLE 5

Properties Using Propyltex 200 Pore Former
With and Without Seeding With P-25

|  | Example 10 | Example 11 |
|---|---|---|
| Wt % seed | 0.0 | 5.0 |
| 900° C., 3 hours |  |  |
| % Rutile | 38 | 93% |
| Surface Area, m²/g | 4.4 | 5.5 |
| HgPV, cc/g | 0.34 | 0.43 |
| 940° C., 3 hours |  |  |
| % Rutile | 92.4 | 96 |
| Surface Area, m²/g | 3.2 | 6.4 |
| HgPV, cc/g | 0.32 | 0.44 |

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of forming a shaped article comprising:
   forming a mixture comprising:
      a titania hydrate pulp having a loss on ignition of from about 10 to 45 wt. %, and
      a seed material comprising a titanium oxide, at least a portion of the titanium oxide being in a rutile form,
   forming the mixture into a shaped article; and
   firing the shaped article.

2. The method of claim 1, wherein the titania hydrate pulp comprises a titanium oxide, the titanium oxide being less than 10% in a rutile form.

3. The method of claim 2, wherein the titanium oxide in the titania hydrate pulp is less than 1% rutile.

4. The method of claim 2, wherein the titania hydrate pulp, exclusive of free water, is less than 1% rutile.

5. The method of claim 1, wherein the titania hydrate pulp has a surface area of at least 150 m2/g.

6. The method of claim 1, wherein the fired shaped article comprises a titanium oxide which has a rutile content, expressed as weight percent, which is at least twice that of the rutile content of the titanium oxide in the seed material.

7. The method of claim 1, wherein the titanium oxide in the seed material is at least 10% rutile.

8. The method of claim 7, wherein the titanium oxide in the seed material is at least about 20% rutile.

9. The method of claim 1, wherein the seed material is present in the mixture at 0.1 to 20 wt %, based on the LOI adjusted weight of titanium oxide in the titania hydrate pulp, optionally, from 1.0-10.0 wt %, based on the LOI adjusted weight of titanium oxide in the titania hydrate pulp.

10. The method of claim 1, wherein the seed material has an average particle size of less than 1.0 microns.

11. The method of claim 1, wherein the mixture comprises a dispersion aid.

12. The method of claim 11, wherein the dispersion aid comprises an acid or a base.

13. The method of claim 1, wherein the mixture further comprises from about 0.01 to 30 wt. % of a pore former, based on the LOI adjusted weight of titanium oxide in the titania hydrate pulp.

14. The method of claim 13, wherein the pore former comprises one or more synthetic burnout materials selected from the group consisting of polyethylene waxes, polypropylene waxes, and co-polymers thereof.

15. The method of claim 1, wherein the mixture further comprises from about 0.1 to 5 wt % of a binder, based on the LOI adjusted weight of titanium oxide in the titania hydrate pulp.

16. The method of claim 1, wherein at least about 20% of the titania hydrate pulp is in an amorphous form.

17. The method of claim 1, wherein less than about 5% of the seed material is in an amorphous form.

18. A shaped article formed by the method of claim 1.

19. A method of forming a shaped article comprising:
   forming a mixture comprising:
      a titania hydrate pulp comprising oxidized titanium, at least 20% of the oxidized titanium being in an amorphous form,
      a seed material comprising titanium oxide, at least a portion of the titanium oxide being in a rutile form, less than 5% of the titanium oxide being in an amorphous form, and
      a dispersion aid;
   forming the mixture into a shaped article; and
   firing the shaped article.

20. A shaped article comprising titania having the following characteristics:
   a. at least 90% titanium oxide;
   b. greater than 80% of the titanium oxide being in the rutile phase;
   c. a surface area of at least 2.5 m2/g;
   d. a mercury pore volume of greater than 0.15 cc/g; and
   e. a pore distribution in which between 20 and 90% of the pores have a diameter between 100 and 200 nm.

21. The shaped article of claim 20, wherein the surface area is from about 3 to 15 m2/g.

22. The shaped article of claim 20, wherein the surface area is at least 6 m2/g.

23. The shaped article of claim 20, wherein the mercury pore volume is from about 0.2 to 0.5 cc/g.

24. The shaped article of claim 20, wherein greater than 95% of the titanium oxide is in the rutile phase.

25. The shaped article of claim 20, wherein the shaped article is at least 98% titanium oxide.

26. The shaped article of claim 20, wherein the shaped article has an attrition resistance of less than 1%.

27. A catalytic element comprising the shaped article of claim 20 and a catalytic material supported thereon.

* * * * *